United States Patent
Wang et al.

(10) Patent No.: US 11,327,923 B2
(45) Date of Patent: May 10, 2022

(54) SIGMOID FUNCTION IN HARDWARE AND A RECONFIGURABLE DATA PROCESSOR INCLUDING SAME

(71) Applicant: SambaNova Systems, Inc., Palo Alto, CA (US)

(72) Inventors: Mingran Wang, San Jose, CA (US); Mark Luttrell, Cedar Park, TX (US); Yongning Sheng, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 462 days.

(21) Appl. No.: 16/560,057

(22) Filed: Sep. 4, 2019

(65) Prior Publication Data

US 2021/0064568 A1  Mar. 4, 2021

(51) Int. Cl.
*G06F 7/483* (2006.01)
*G06F 17/17* (2006.01)
*G06F 15/78* (2006.01)

(52) U.S. Cl.
CPC .......... *G06F 15/7867* (2013.01); *G06F 7/483* (2013.01); *G06F 17/17* (2013.01)

(58) Field of Classification Search
CPC ................................. G06F 17/10; G06F 17/17
See application file for complete search history.

(56) References Cited

U.S. PATENT DOCUMENTS

| | | | |
|---|---|---|---|
| 5,365,465 A | 11/1994 | Larson | |
| 5,506,797 A | 4/1996 | Koshiba | |
| 6,256,653 B1 | 7/2001 | Juffa et al. | |
| 7,015,921 B1 | 3/2006 | Trivedi et al. | |
| 7,472,149 B2 | 12/2008 | Endo | |
| 8,184,317 B2 | 5/2012 | Okamoto | |
| 9,411,756 B2 | 8/2016 | Nogueira et al. | |
| 10,698,853 B1 | 6/2020 | Grohoski et al. | |

(Continued)

FOREIGN PATENT DOCUMENTS

| | | |
|---|---|---|
| CN | 109871235 A | 6/2019 |
| CN | 110471643 A | 11/2019 |

(Continued)

OTHER PUBLICATIONS

U.S. Appl. No. 16/695,138—Response to Final Office Action dated Oct. 21, 2021, filed Jan. 13, 2022, 10 pages.

(Continued)

*Primary Examiner* — Chuong D Ngo
(74) *Attorney, Agent, or Firm* — Haynes Beffel & Wolfeld LLP; Sikander Khan; Bruce Young (57) ABSTRACT

A functional unit for a data processor comprises an input register to store a variable X; a first circuit, having an input connected to the input register and an output, to generate a value $e^X$ on its output; a second circuit, having an input connected to the input register and an output, to generate an output which is a value $(\tan h(X/2)+1)/2$ on its output; a comparator, having an input connected to the input register and an output, to generate a line on its output based on a comparison between X and a constant; and a selector to select between inputs connected to the outputs of the first circuit and the second circuit, in response to the output of the comparator, and provide an output representing a value sigmoid(X).

22 Claims, 8 Drawing Sheets

(56) References Cited

U.S. PATENT DOCUMENTS

| | | | |
|---|---|---|---|
| 11,106,430 | B1 | 8/2021 | Kadkol et al. |
| 2003/0068097 | A1 | 4/2003 | Wilson et al. |
| 2005/0160129 | A1 | 7/2005 | Endo |
| 2012/0030203 | A1 | 2/2012 | Chiang et al. |
| 2013/0151576 | A1 | 6/2013 | Lutz et al. |
| 2013/0262539 | A1 | 10/2013 | Wegener |
| 2013/0339564 | A1 | 12/2013 | Nogueira et al. |
| 2014/0040334 | A1 | 2/2014 | Burgess et al. |
| 2014/0222883 | A1 | 8/2014 | Pineiro et al. |
| 2017/0054449 | A1 | 2/2017 | Mani et al. |
| 2017/0244982 | A1 | 8/2017 | Fuldseth et al. |
| 2017/0322774 | A1 | 11/2017 | Zhang |
| 2017/0322805 | A1 | 11/2017 | Zohar et al. |
| 2018/0157465 | A1 | 6/2018 | Bittner et al. |
| 2018/0174022 | A1 | 6/2018 | Young |
| 2018/0220144 | A1 | 8/2018 | Su et al. |
| 2018/0329681 | A1 | 11/2018 | Zhang et al. |
| 2019/0042244 | A1 | 2/2019 | Henry et al. |
| 2019/0042922 | A1* | 2/2019 | Pillai ............... G06N 3/0454 |
| 2019/0042924 | A1 | 2/2019 | Pasca et al. |
| 2019/0114139 | A1 | 4/2019 | Zhang |
| 2019/0114555 | A1* | 4/2019 | Akerib ............... G06N 3/063 |
| 2019/0147323 | A1 | 5/2019 | Li et al. |
| 2019/0205734 | A1 | 7/2019 | Guntoro |
| 2019/0279075 | A1 | 9/2019 | Liu et al. |
| 2019/0341052 | A1 | 11/2019 | Allibhai |
| 2020/0134475 | A1* | 4/2020 | Hill ....................... G06N 3/08 |
| 2020/0159544 | A1 | 5/2020 | Shah et al. |
| 2020/0159692 | A1 | 5/2020 | Shah et al. |
| 2020/0272882 | A1 | 8/2020 | Lo |
| 2020/0371805 | A1 | 11/2020 | Lutz |
| 2021/0034982 | A1 | 2/2021 | Sather et al. |
| 2021/0064341 | A1 | 3/2021 | Kuo et al. |
| 2021/0064372 | A1 | 3/2021 | Sun et al. |
| 2021/0072955 | A1 | 3/2021 | Mellempudi et al. |
| 2021/0096816 | A1 | 4/2021 | Wang et al. |
| 2021/0216873 | A1 | 7/2021 | Liu |

FOREIGN PATENT DOCUMENTS

| | | |
|---|---|---|
| TW | I318337 B | 12/2009 |
| TW | I557641 B | 11/2016 |
| TW | 201935329 A | 9/2019 |
| WO | 2008036944 A1 | 3/2008 |
| WO | 2010142987 A1 | 12/2010 |
| WO | 2018/100920 A1 | 6/2018 |
| WO | 2021046274 A1 | 3/2021 |
| WO | 2021067318 A1 | 4/2021 |
| WO | 2021108328 A1 | 6/2021 |
| WO | 2021126530 A1 | 6/2021 |

OTHER PUBLICATIONS

TW 109140964 First Office Action, dated Jan. 12, 2022, 11 pages.
U.S. Appl. No. 16/688,069 Notice of Allowance, dated Jan. 14, 2022, 22 pages.
TW 109140965 First Office Action, dated Dec. 21, 2021, 8 pages.
TW 109134270—Response to First Office Action dated Sep. 30, 2021, filed Dec. 29, 2021, 13 pages.
TW 109139904 First Office Action, dated Nov. 22, 2021, 19 pages.
"Activation Function," Downloaded from Wikipedia on Aug. 16, 2019, 3 pages.
Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.
Eppler et al.,"High speed neural network chip for trigger purposes in high energy physics," IEEE, Proc. of the conference on design, automation and test in Europe, Feb. 1998, 8 pages.
Gomar et al. "Precise digital implementations of hyperbolic tanh and sigmoid function," 2016 50th Asilomar Conference an Signals, Systems and Computers, Nov. 6-9, 2016, 4 pages.
Lin et al., "A Digital Circuit Design of Hyperbolic Tangent Sigmoid Function for Neural Networks," 2018 IEEE Int'l Symp. on Circuits and Systems, May 18-21, 2018, 4 pages.
Prabhakar et al., "Plasticine: A Reconfigurable Architecture for Parallel Patterns," ISCA 2017, Jun. 24-28, 2017, 14 pages.
Turkson et al. "Artificial neural network applications in the calibration of spark-ignition engines: An overview," Engineering Science and Technology, an International Journal, vol. 19, Issue 3, Sep. 2016, 1346-1359.
Wikipedia "bfloat16 floating-point format," downloaded Aug. 19, 2019, 2 pages.
Cook, "Comparing bfloat16 range and precision to other 16-bit numbers," www.johndcook.com/blog/2018/11/15/bfloat16, downloaded on Nov. 15, 2018, 4 pages.
Intel BLOAT16—Hardware Numerics Definition White Paper, Rev. 1.0, Nov. 2018, 7 pages.
Anonymous: "Rounding to 0.5", Arduino Forum, Aug. 28, 2017, 14 pages.
MISB ST 1201.4, "Floating Point to Integer Mapping," Feb. 28, 2019, pp. 1-21.
PCT/US2020/061862—International Search Report and Written Opinion dated Mar. 10, 2021, 11 pages.
PCT/US2020/062905—International Search Report and Written Opinion dated Mar. 22, 2021, 14 pages.
U.S. Appl. No. 16/590,058—Office Action dated Jun. 1, 2021, 9 pages.
U.S. Appl. No. 16/695,138—Non-Final Office Action dated Apr. 22, 2021, 11 pages.
U.S. Office Action in U.S. Appl. No. 16/688,069 dated Jun. 3, 2021, 9 pages.
Wikipedia "Batch normalization," downloaded Feb. 25, 2021, 10 pages.
Ioffe, et al., "Batch Normalization: Accelerating Deep Network Training by Reducing Internal Covariate Shift," Cornell University, available at https://arxiv.org/abs/1502.03167, Mar. 2, 2015, 11 pages.
Koeplinger et al., "Spatial: A Language and Compiler for Application Accelerators," PLDI '18, Jun. 18-22, 2018, Association for Computng Machinery, 16 pages.
U.S. Appl. No. 16/260,548 "Matrix Normal/Transpose Read and a Reconfigurable Data Processor Including Same," Jan. 29, 2019, 43 pages.
U.S. Appl. No. 16/407,675 "Control Flow Barrier and Reconfigurable Data Processor ," May 9, 2019, 32 pages.
U.S. Appl. No. 16/504,627 "Quiesce Reconfigurable Data Processor," Jul. 8, 2019, 78 pages.
U.S. Appl. No. 16/536,192 "Compiler Flow Logic for Reconfigurable Architectures ," Aug. 8, 2019, 57 pages.
U.S. Appl. No. 16/572,516 "Efficient Execution of Operation Unit Graphs on Reconfigurable Architectures Based on User Specification ," Sep. 16, 2019, 63 pages.
U.S. Appl. No. 16/572,527 "Performance Estimation-Based Resource Allocation for Reconfigurable Architectures" Sep. 16, 2019, 68 pages.
U.S. Appl. No. 16/590,058 "Computation Units for Functions Based on Lookup Tables" Oct. 1, 2019, 37 pages.
U.S. Appl. No. 16/688,069 "Look-Up Table with Input Offsetting" Nov. 19, 2019, 36 pages.
U.S. Appl. No. 16/695,138 "Computational Units for Batch Normalization" Nov. 25, 2019, 47 pages.
U.S. Appl. No. 16/718,094 "Computational Units for Element Approximation" Dec. 17, 2019, 87 pages.
Iqbal, "Reconfigurable Processor Artchitecture for High Speed Applications," IEEE Int'l Advance Computing Conference (IACC 2009), Patiala, India, Mar. 6-7, 2009, 6 pages.
Kumar, Pasupuleti Sirish et al,"Low Complex & High Accuracy Computation Approximations to Enable On-Device RNN Applications", 2019 IEEE International Symposium on Circuits and Systems (Iscas), IEEE, May 26, 2019 (May 26, 2019), pp. 1-5.
Olukotun, "Designing Computer Sytems for Software 2.0," ISCA 2018 keynote, Jun. 2018, 49 pages.
PCT/US2020/49285—International Search Report and Written Opinion dated Nov. 18, 2020, 13 pages.

(56) References Cited

OTHER PUBLICATIONS

U.S. Office Action in U.S. Appl. No. 16/688,069 dated Jan. 29, 2021, 18 pages.
Wikipedia "Floor and ceiling functions," downloaded Aug. 12, 2019, 5 pages.
Pasupuleti-etal, Low Complex High Accuracy Computation Approximations to Enable on device RNN Applications, May 26, 2019, 5 pages.
POT/US2020/053344—International Search Report and Written Opinion dated Dec. 21, 2020, 11 pages.
PCT/US2020/061060—International Search Report and Written Opinion dated Mar. 4, 2021, 14 pages.
U.S. Appl. No. 16/590,058—Response to Non-Final Office Action dated Jun. 1, 2021 as filed on Aug. 18, 2021, 20 pages.
U.S. Appl. No. 16/695,138—Response to Non-Final Office Action dated Apr. 22, 2021 as filed Jul. 22, 2022, 8 pages.
U.S. Appl. No. 16/688,069—Response to Non-Final Office Action dated Jan. 29, 2021, as filed Mar. 31, 2021, 20 pages.
TW 109129892—First Office Action dated Aug. 12, 2021, 19 pages.
TW 109134270—First Office Action dated Sep. 30, 2021, 6 pages.
U.S. Appl. No. 16/688,069—Notice of Allowance dated Sep. 22, 2021, 26 pages,
Podobas et al, A Survey on Coarse-Grained Reconfigurable Architectures From a Performance Perspective, IEEEAccess, vol. 2020. 3012084, Jul. 27, 2020, 25 pages.
M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.
U.S. Appl. No. 16/590,058 Notice of Allowance, dated Nov. 3, 2021, 15 pages.
U.S. Appl. No. 16/695,138 Final Office Action, dated Oct. 21, 2021, 12 pages.
U.S. Appl. No. 16/688,069—Response to Non-Final Office Action dated Jun. 3, 2021, as filed Sep. 3, 2021, 9 pages.
U.S. Appl. No. 16/718,094 Notice of Allowance, dated Jun. 14, 2021, 15 pages.
TW 109129892—Response to First Office Action dated Oct. 21, 2021, 17 pages.
TW 109129892 Notice of Allowance, dated Nov. 1, 2021, 3 pages.
Bendersky "The Softmax function and its derivative," https://eli.thegreenplace.net/2016/the-softmax-function-and-its-derivative, Oct. 18, 2016, 11 pages.
Petersen, "Softmax with cross-entropy," https://mattpetersen.github.io/softmax-with-cross-entropy, Jun. 25, 2017, 19 pages.

* cited by examiner

SIGMOID FUNCTION IN HARDWARE AND A RECONFIGURABLE DATA PROCESSOR INCLUDING SAME

BACKGROUND

Field

The present invention relates to technology of low power, compact implementations of activation functions, including sigmoid functions, such as commonly utilized in machine learning.

Description of Related Art

Machine learning networks, such as recurrent and convolutional neural networks, can include arrays of computational units analogous to "neurons" arranged in many layers. In some implementations, these computational units can execute functions, such as a sum-of-products, that produces an intermediate value, which is then transformed using an activation function to produce the output of the unit. A variety of activation functions have been utilized, including rectified linear unit ReLU, sigmoid, hyperbolic tangent, softplus, and others. See, Activation function—Wikipedia (https://en.wikipedia.org/wiki/Activation_function—8/16/2019, 10:57 AM). Activation functions can consume a substantial portion of the computational resources of the system.

A mathematical representation of a sigmoid function is:

$$S(X) = \frac{1}{1+e^{-X}}$$

A sigmoid function can be implemented using typical arithmetic logic unit ALU circuits having adders, multipliers and dividers, for example. Also the sigmoid function can be implemented using a look-up table. However, the ALU and look-up table approach can involve latencies making them unsuitable for some high performance implementations. Alternatively, the look-up table can be compiled to form a combinational logic circuit to provide the result of the sigmoid function. However, such circuits are large and consume significant power at high speeds.

As machine learning based technologies are more widely deployed, it is becoming important to implement them at low cost using flexible architectures. In such architectures, including integrated circuit components, area and power consumption are critical design parameters. One class of integrated circuits includes reconfigurable processors, including field programmable gate arrays (FPGAs), which can be configured to implement a variety of functions more efficiently or faster than might be achieved using a general purpose processor executing a computer program. So-called coarse-grain reconfigurable architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

It is desirable therefore to provide an area/power efficient way to implement non-linear functions such as the sigmoid, which can be applied as activation functions, including implementations suitable for use in integrated circuits, including as modules in programmable processors such as coarse-grain reconfigurable architecture (CGRA) devices.

SUMMARY

An area/power efficient way is provided to implement non-linear functions, including a sigmoid function, usable as activation functions in machine learning and in other environments. The technique can be applied in an integrated circuit, such as a reconfigurable data processor.

As described herein, a sigmoid function sig(X) is a non-linear function which can be approximated by two or more different functions, each of which is used to represent the sigmoid over respective parts of the domain of the input variable X, including a first part of the domain in which X is large negative number more negative than a constant C, and a second part of the domain in which X is greater than C. The combination of two or more different functions can require less computational power and area than a circuit that directly computes the sigmoid over the input domain.

In an implementation described herein, sig(X) is approximated using a hyperbolic tangent function of X over a first part of the domain of X, using e^X, over a second part of the domain of X, and using a comparator to delineate the domain in which the input X falls. The two or more different functions and the comparator can be implemented using circuits arranged to execute in parallel, and the output selected to represent the sigmoid is determined by part of the domain indicated by the comparator.

In an implementation described herein, a sigmoid function circuit is described comprising an input register to store a variable X; a first circuit, having an input connected to the input register and an output, to generate a value $e^X$ on its output; a second circuit, having an input connected to the input register and an output, to generate an output value tan h(X/2)+1)/2 on its output; a comparator, having an input connected to the input register and an output, to generate a line on its output based on a comparison between X and a constant which divides the input domain; and a selector to select between the outputs of the first circuit and the second circuit, in response to the output of the comparator, and provide an output representing a value sigmoid(X). The constant for this combination of functions can be a negative number of magnitude greater than 4 (i.e. more negative than −4, or less than −4), used to select the output of the first circuit when X is less than the constant, and to select the output of the second circuit otherwise.

For processors supporting floating point operations, the variable X can be represented in floating point format, and the output of the selector is represented in the floating point format.

In a floating point format, the variable X is represented by a significand and an exponent, and the second circuit producing the value tan h(X/2)+1)/2 can include a stage configurable to subtract 1 from the exponent of the variable X to produce a value X/2, a stage which generates a value tan h(X/2), a stage which adds 1 to provide tan h(X/2)+1, and a stage to subtract 1 from the exponent of tan h(X/2)+1 to generate the value (tan h(X/2)+1)/2. Thus, the divisions executed in this second circuit can be implemented using simple subtraction of 1 from the exponent. The first circuit can comprise a circuit producing the output $e^X$ over the first part of the input domain.

The functional unit includes an output register to receive the output of the selector, and wherein the input register and output register are controlled by a unit clock. The first and second circuits can be implemented using circuits, so that the output representing the value sig(X) from the input X in the input register is produced in one system clock period, and can be stored in the output register in one cycle of the unit clock.

In one embodiment, the second circuit in the functional unit is configurable to provide on its output the value (tan h(X/2)+1)/2 or the value tan h(X) based on a configuration parameter or opcode.

The selector is configurable to select between inputs connected to the outputs of the first circuit and the second circuit, in response to the output of the comparator, and provide an output representing a value sigmoid(X), to select the input connected to the output of the first circuit independent of the output of the comparator to provide the value $e^X$ on its output, and to select the input connected to the output of the second circuit independent of the output of the comparator to provide the value tan h(X).

A reconfigurable data processor is provided that comprises an array of configurable units, and a bus system connected to the array of configurable units which communicates data at a processor clock rate.

A functional unit in a configurable unit in the array of configurable units includes an input register to store a variable X; a first circuit, having an input connected to the input register and an output, to generate a value $e^X$ on its output; a second circuit, having an input connected to the input register and an output, to generate an output which is a value (tan h(X/2)+1)/2 on its output; a comparator, having an input connected to the input register and an output, to generate a line on its output based on a comparison between X and a constant; and a selector to select between inputs connected to the outputs of the first circuit and the second circuit, in response to the output of the comparator, and provide an output representing a value sigmoid(X) in one cycle of a unit clock, which can have the same clock rate as the processor clock.

A method for computing a sigmoid function in a functional unit for a data processor is provided. The method comprises storing a variable X in an input register; generating a value $e^X$ on an output of a first circuit, the first circuit having an input connected to the input register; generating a value (tan h(X/2)+1)/2 on an output of a second circuit, the second circuit having an input connected to the input register; generating a line on an output of a comparator based on a comparison between X and a constant, the comparator having an input connected to the input register; and selecting between the outputs of the first circuit and the second circuit, in response to the output of the comparator, and providing a result representing a value sigmoid(X) on an output of a selector, the selector having inputs connected to the outputs of the first circuit and the second circuit.

Other aspects and advantages of the present invention can be seen on review of the drawings, the detailed description and the claims, which follow.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Figure 1:
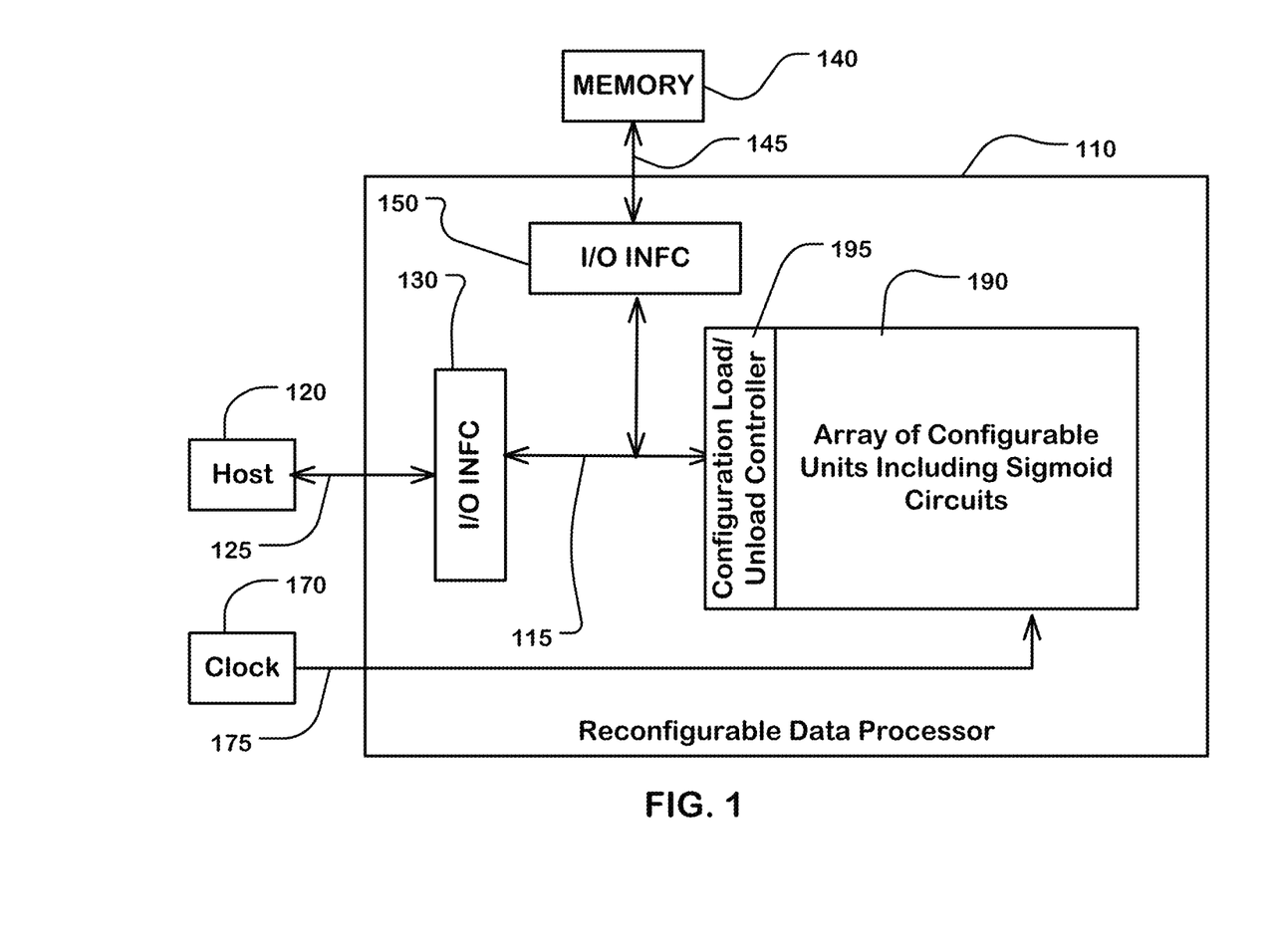
FIG. 1 is a system diagram illustrating a system including a host, a memory, and a reconfigurable data processor.

FIG. 1 is a system diagram illustrating a system including a host 120, a memory 140, and a reconfigurable data processor 110. As shown in the example of FIG. 1, the reconfigurable data processor 110 includes an array 190 of configurable units and a configuration load/unload controller 195. An array 190 of configurable units can include sigmoid circuits as described herein.

The processor 110 includes an external I/O interface 130 connected to the host 120 by line 125, and an external I/O interface 150 connected to the memory 140 by line 145. The I/O interfaces 130, 150 connect via a bus system 115 to the array 190 of configurable units and to the configuration load/unload controller 195. The bus system 115 may have a bus width of carrying one chunk of data, which can be for this example 128 bits (references to 128 bits throughout can be considered as an example chunk size more generally).

To configure configurable units in the array 190 of configurable units with a configuration file, the host 120 can send the configuration file to the memory 140 via the interface 130, the bus system 115, and the interface 150 in the reconfigurable data processor 110. The configuration file can be loaded in many ways, as suits a particular architecture, including in data paths outside the configurable processor 110. The configuration file can be retrieved from the memory 140 via the memory interface 150. Chunks of the configuration file can then be sent in a distribution sequence to configurable units in the array 190 of configurable units in the reconfigurable data processor 110.

An external clock generator 170 or other clock line sources can provide a clock line 175 or clock lines to elements in the reconfigurable data processor 110, including the array 190 of configurable units, and the bus system 115, and the external data I/O interfaces.

The bus system 115 can communicate data at a processor clock rate via a clock line 175 or clock lines. A functional unit (e.g. 483, FIG. 4) in a configurable unit (e.g. 400, FIG. 4) in an array 190 of configurable units can include a sigmoid circuit. The sigmoid circuit can be implemented using combinational circuits (also known as combinatorial circuits) so as to provide an output representing a value sigmoid (X) of an input variable X stored in an input register to an output register in one cycle of a clock applied to the unit, which can be the same as the processor clock, for low latency computation of a data value representing the sigmoid.

Figure 2:
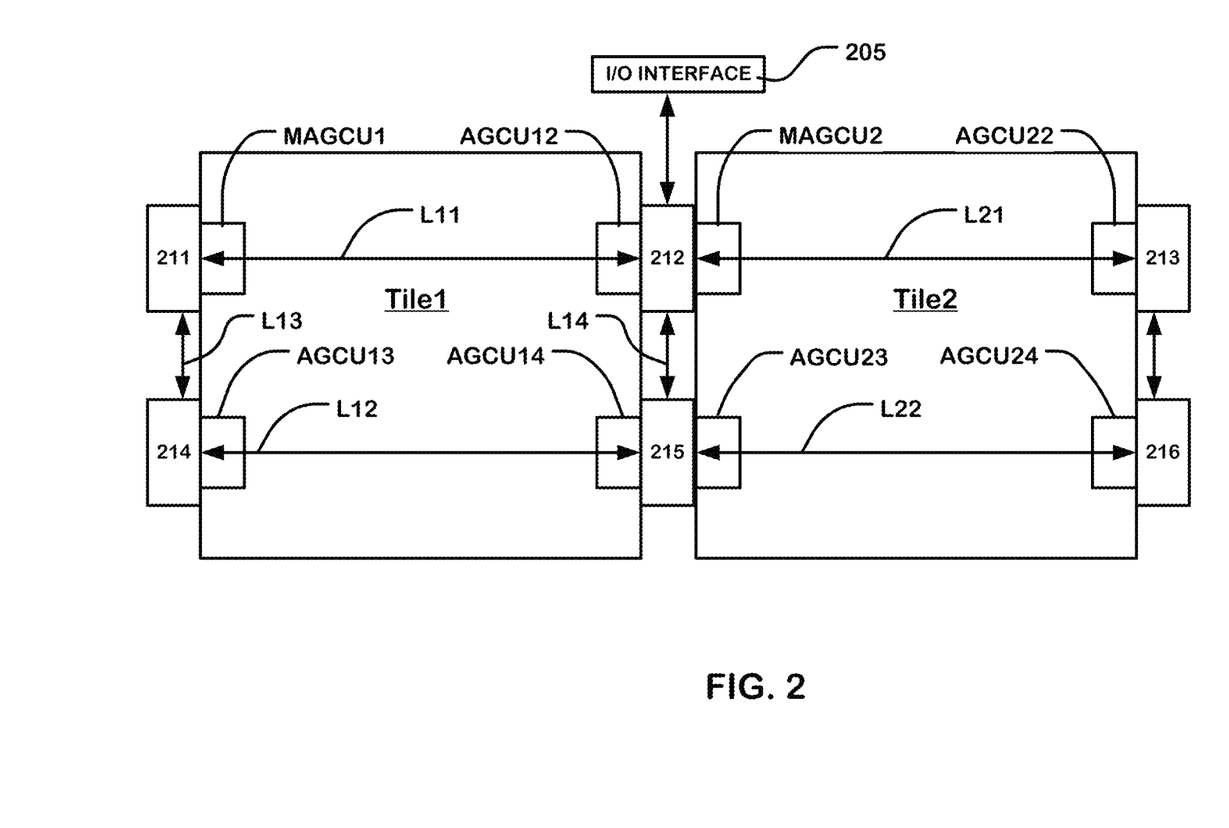
FIG. 2 is a simplified block diagram of a top level network and components of a CGRA (Coarse Grain Reconfigurable Architecture).

FIG. 2 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including array level networks in this example. An array of configurable units (e.g. 190, FIG. 1) in the tile includes sigmoid circuits. The bus system includes a top level network connecting the tiles to external I/O interface 205 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g. MAGCU1, AGCU12, AGCU13, AGCU14). The AGCUs are nodes on the top level network and nodes on the array level networks, and include resources for routing data among nodes on the top level network and nodes on the array level network in each tile.

Nodes on the top level network in this example include one or more external I/Os, including interface 205. The interfaces to external devices include resources for routing data among nodes on the top level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top level network and the array level network or networks.

The top level network is constructed using top level switches (211-216) connecting to each other as well as to other nodes on the top level network, including the AGCUs, and I/O interface 205. The top level network includes links (e.g. L11, L12, L21, L22) connecting the top level switches. Data travel in packets between the top level switches on the links, and from the switches to the nodes on the network connected to the switches. For example, top level switches 211 and 212 are connected by a link L11, top level switches 214 and 215 are connected by a link L12, top level switches 211 and 214 are connected by a link L13, and top level switches 212 and 213 are connected by a link L21. The links can include one or more buses and supporting control lines, including for example a chunk-wide bus (vector bus). For example, the top level network can include data, request and response channels operable in coordination for transfer of data in a manner analogous to an AXI compatible protocol. See, AMBA® AXI and ACE Protocol Specification, ARM, 2017.

Top level switches can be connected to AGCUs. For example, top level switches 211, 212, 214 and 215 are connected to MAGCU1, AGCU12, AGCU13 and AGCU14 in the tile Tile1, respectively. Top level switches 212, 213, 215 and 216 are connected to MAGCU2, AGCU22, AGCU23 and AGCU24 in the tile Tile2, respectively.

Top level switches can be connected to one or more external I/O interfaces (e.g. interface 205).

Figures 3, 3A:
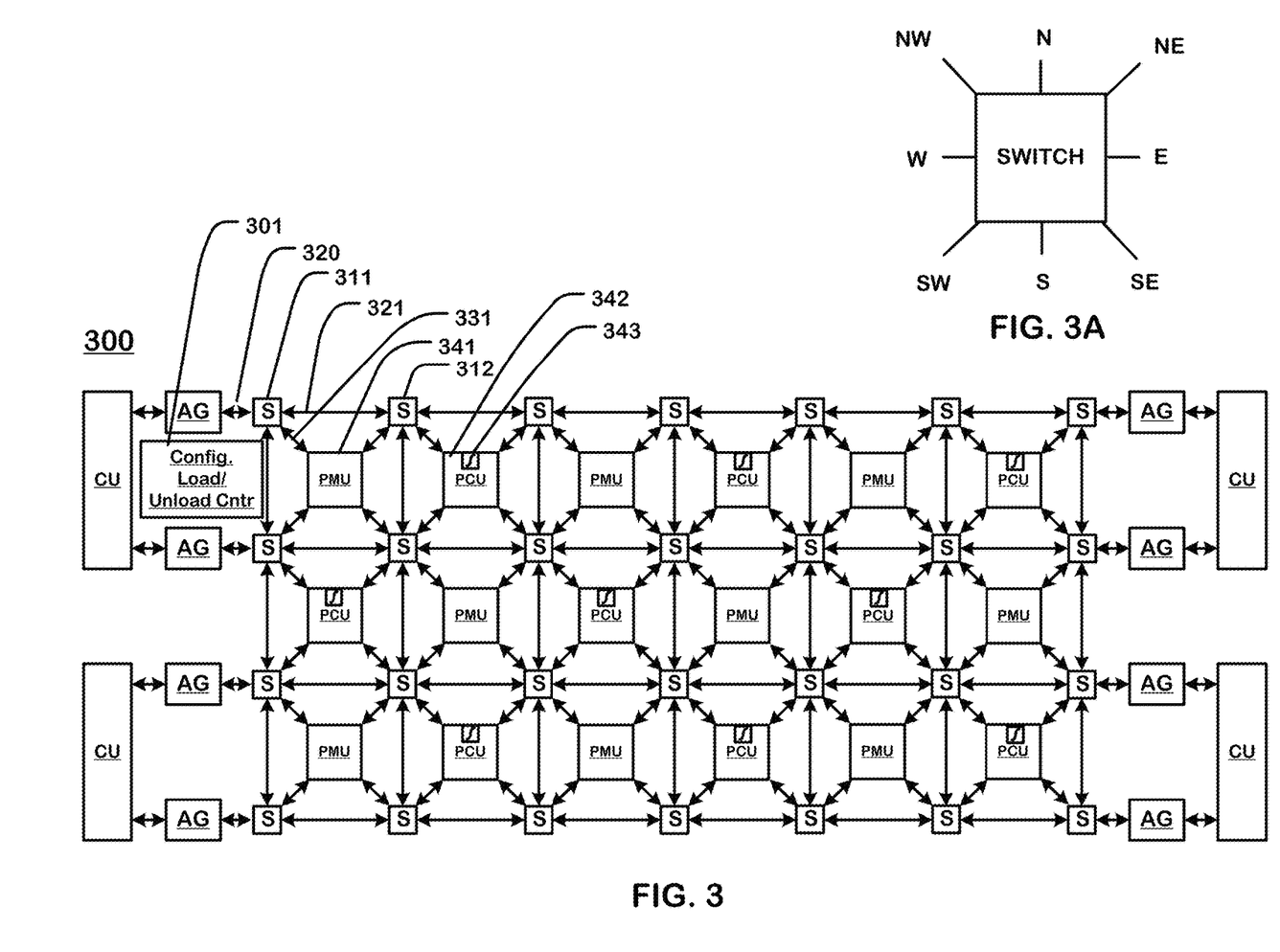
FIG. 3 is a simplified diagram of a tile and an array level network usable in the configuration of FIG. 2, where the configurable units are nodes on the array level network and include sigmoid functional circuits.
FIG. 3A illustrates an example switch unit connecting elements in an array level network.

FIG. 3 is a simplified diagram of a tile and an array level network usable in the configuration of FIG. 2, where the configurable units in the array are nodes on the array level network.

In this example, the array of configurable units 300 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. In this example, the PCUs (e.g. 342) in the array of configurable units 300 include sigmoid circuits (e.g. 343), as further described herein. Each of these configurable units contains a configuration store comprising a set of registers or flip-flops that represent either the setup or the sequence to run a program, and can include the number of nested loops, the limits of each loop iterator, the routes and/or instructions to be executed for each stage including sigmoid functions, the source of the operands, and the network parameters for the input and output interfaces.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit-file. Program load is the process of setting up the configuration stores in the array of configurable units based on the contents of the bit file to allow the components to execute a program (i.e., a machine), including programs that utilize the sigmoid circuits 343. Program Load may also require the load of all PMU memories.

The array level network includes links interconnecting configurable units in the array. The links in the array level network include one or more and, in this case, three kinds of physical buses: a chunk-level vector bus (e.g. 128 bits of data), a word-level scalar bus (e.g. 32 bits of data), and a multiple bit-level control bus. For instance, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:
  A bit to indicate if the chunk is scratchpad memory or configuration store data.
  Bits that form a chunk number.
  Bits that indicate a column identifier.
  Bits that indicate a row identifier.
  Bits that indicate a component identifier.

For a load operation, the configuration load controller can send the number N of chunks to a configurable unit in order from N−1 to 0. For this example, the 6 chunks are sent out in most-significant-bit-first order of Chunk 5->Chunk 4->Chunk 3->Chunk 2->Chunk 1->Chunk 0. (Note that this most-significant-bit-first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 3A illustrates an example switch unit connecting elements in an array level network. As shown in the example of FIG. 3A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 341 can be sent from the configuration load/unload controller 301 to the PMU 341, via a link 320 between the configuration load/unload controller 301 and the West (W) vector interface of the switch unit 311, the switch unit 311, and a link 331 between the Southeast (SE) vector interface of the switch unit 311 and the PMU 341.

Figure 4:
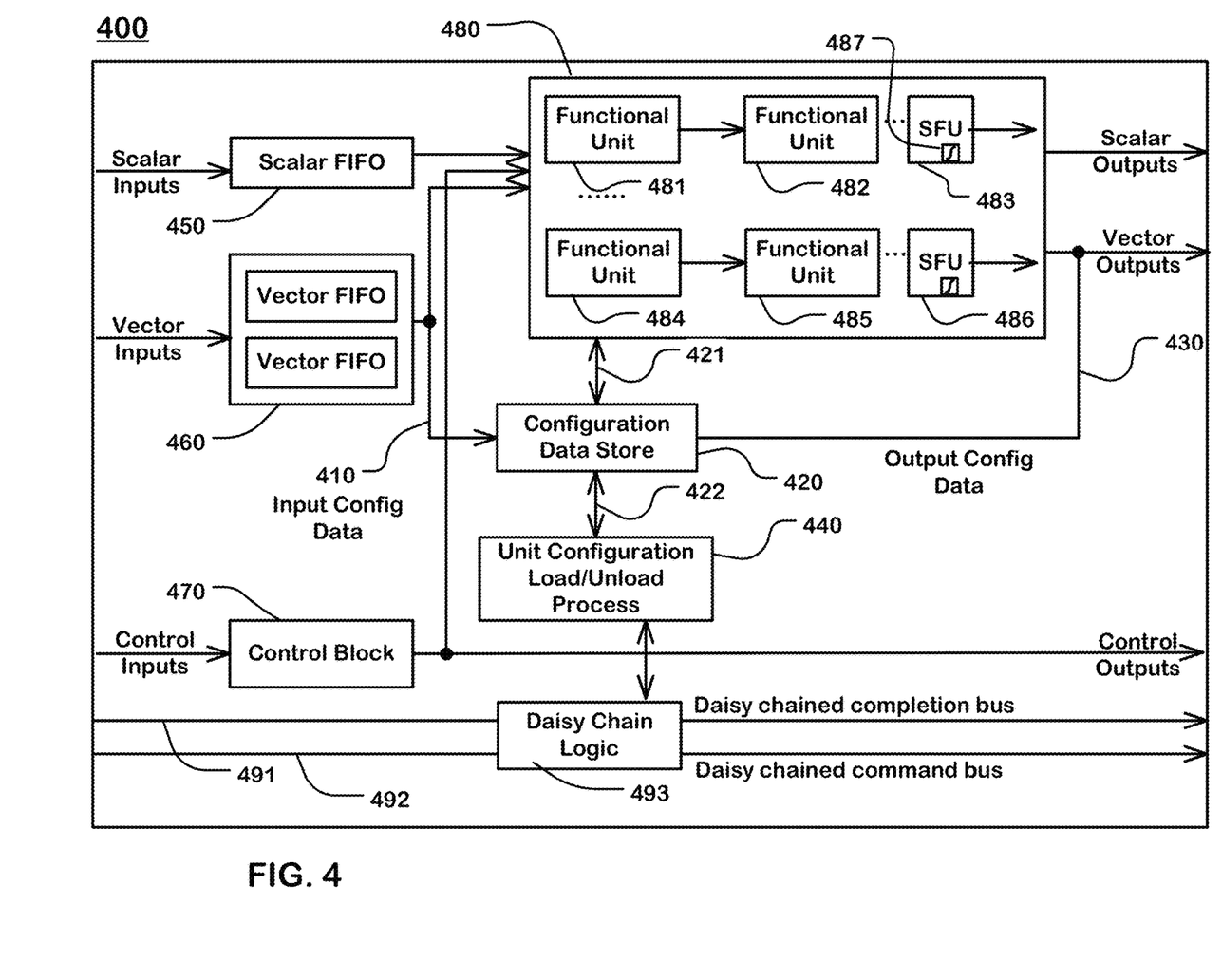
FIG. 4 is a block diagram illustrating an example configurable unit.

In this example, one of the AGCUs is configured to be a master AGCU, which includes a configuration load/unload controller (e.g. 301). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (150, FIG. 1). Each of the memory interfaces can be accessed using several AGCUs. Each AGCU contains a reconfigurable scalar datapath to generate requests for the off-chip memory. Each AGCU contains FIFOs (first-in-first-out buffers for organizing data) to buffer outgoing commands, data, and incoming responses from the off-chip memory.

FIG. 4 is a block diagram illustrating an example configurable unit 400, such as a Pattern Compute Unit (PCU). A configurable unit can interface with the scalar, vector, and control buses, in this example using three corresponding sets of inputs and outputs (10): scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process, and transmitting and receiving data during operation after configuration across a long pipeline between multiple PCUs. Control IOs can be used to communicate signals on control lines such as the start or end of execution of a configurable unit. Control inputs are received by control block 470, and control outputs are provided by the control block 470.

Each vector input is buffered in this example using a vector FIFO in a vector FIFO block 460 which can include one or more vector FIFOs. Likewise in this example, each scalar input is buffered using a scalar FIFO 450. Using input FIFOs decouples timing between data producers and consumers, and simplifies inter-configurable-unit control logic by making it robust to input delay mismatches.

A configurable unit includes multiple reconfigurable datapaths in block 480. A datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 420 is connected to the multiple datapaths in block 480 via lines 421.

A configurable datapath organized as a multi-stage pipeline can include multiple functional units (e.g. 481, 482, 483; 484, 485, 486) at respective stages. A special functional unit SFU (e.g. 483, 486) in a configurable datapath can include a configurable module 487 that comprises sigmoid circuits and other specialized computational circuits, the combinations of which can be optimized for particular implementations. In one embodiment, a special functional unit can be at the last stage of a multi-stage pipeline, and can be configured to receive an input line X from a functional unit (e.g. 482, 486) at a previous stage in a multi-stage pipeline. In some embodiments, a configurable unit like a PCU can include many sigmoid circuits, or many special functional units which are configured for use in a particular graph using configuration data.

Sigmoid circuits in a special functional unit can provide an output representing a value sigmoid (X) of the input line X in one cycle of the unit clock, which can have the same rate as the processor clock.

Configurable units in the array of configurable units include configuration data stores 420 (e.g. serial chains) to store unit files comprising a plurality of chunks (or sub-files of other sizes) of configuration data particular to the corresponding configurable units. Configurable units in the array of configurable units each include unit configuration load logic 440 connected to the configuration data store 420 via line 422, to execute a unit configuration load process. The unit configuration load process includes receiving, via the bus system (e.g. the vector inputs), chunks of a unit file particular to the configurable unit, and loading the received chunks into the configuration data store 420 of the configurable unit. The unit file loaded into the configuration data store 420 can include configuration data, including opcodes and routing configuration, for circuits (e.g. module 487) implementing a sigmoid function as described with reference to FIGS. 6 and 7.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 410 can be provided to a vector FIFO as vector inputs, and then be transferred to the configuration data store 420. Output configuration data 430 can be unloaded from the configuration data store 420 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 4, a daisy-chained completion bus 491 and a daisy-chained command bus 492 are connected to daisy-chain logic 493, which communicates with the unit configuration load logic 440. The daisy-chain logic 493 can include load complete status logic, as described below. The daisy-chained completion bus is further described below. Other topologies for the command and completion buses are clearly possible but not described here.

A Pattern Memory Unit (e.g. PMU) can contain scratchpad memory coupled with a reconfigurable scalar datapath intended for address calculation, along with the bus interfaces used in the PCU. PMUs can be used to distribute on-chip memory throughout the array of reconfigurable units. In one embodiment, address calculation within the memory in the PMUs is performed on the PMU datapath, while the core computation is performed within the PCU. In some embodiments, a PMU can include special functional units having sigmoid circuits.

Figure 5A:
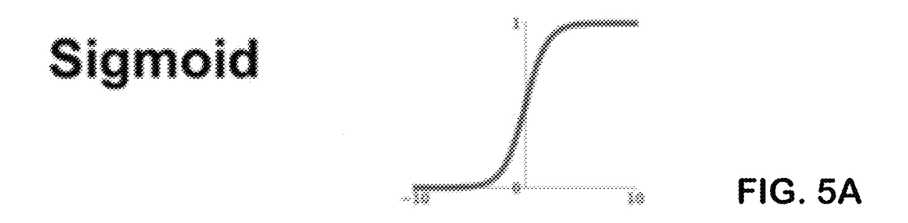
FIG. 5A illustrates a sigmoid function that can be implemented in hardware for an activation function in machine learning.

FIG. 5A illustrates a sigmoid function, for reference.

Figure 5B:
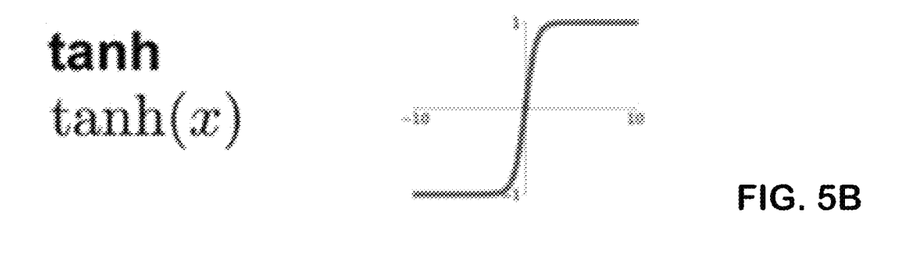
FIG. 5B illustrates a hyperbolic tangent tan h function that can be implemented in hardware for an activation function in machine learning.

FIG. 5B illustrates a hyperbolic tangent tan h function. A mathematical representation of a tan h function is:

$$\tanh X = \frac{e^X - e^{-X}}{e^X + e^{-X}}$$

A difference between a tan h function and a sigmoid function is that the range of a tan h function is (−1,1) and the range of a sigmoid function is (0,1), as shown in FIGS. 5A and 5B.

A sigmoid function can be represented using a tan h function as follows:

$$\text{sig}(X) = (\tan h(X/2) + 1)/2$$

The tan h function can be implemented in combinational circuits based compilation of a lookup table in a manner that is area efficient in part due to the following factors:

tan h X is symmetrical about the zero axes, so computations can ignore the sign of X and only operate on positive values. The sign of the output will always be the same as the sign of the input.

When X is a large positive number, tan h(X) is 1. When X is a large negative number, tan h(X) is −1.

When X is close to zero, tan h(X)=X.

For other values of where the above conditions do not accurately approximate tan h(X), a lookup table can be used.

A lookup table uses the input X as an index to obtain a predefined value for the output from a table stored in a circuit. The circuit can be implemented in SRAM, ROM, DRAM, or built from custom logic.

To provide a circuit to implement the sigmoid for floating point numbers using the tan h circuit, the value X/2 is obtained by subtracting 1 from the exponent of the input X, applying the result to the tan h circuit, adding 1 to the output to get the numerator (tan h(X/2)+1), and then performing the division by subtracting 1 from the exponent of the numerator, yielding sig(X).

A characteristic of use of this approach for floating point numbers, including BF16 and FP32 format number for example, can be seen when the input X is a large negative number. In this case, tan h (X/2) becomes −1, and (tan h(X/2)+1) becomes 0. This results in a problem associated with use of floating point format variables like BF16 of losing resolution in sig(X), and increasing the error rate, when the input X is a large negative number.

To fix this problem, another approximation for sig(X) when X is a large negative number can be used. When X is a large negative number, $e^{-X}$ is much greater than 1, so that the number "1" in the denominator $(1+e^{-X})$ in the equation for sig(X) becomes negligible and can be thrown away, so that the sigmoid function is approximated by $1/e^{-X}$. Consequently, an approximation for sigmoid (X) when X is a large negative number can be represented as $$S(X)=e^X$$

An example circuit for implementing a sigmoid function including this approximation for sigmoid (X) when X is a large negative number is described with reference to FIG. 6.

Figure 6:
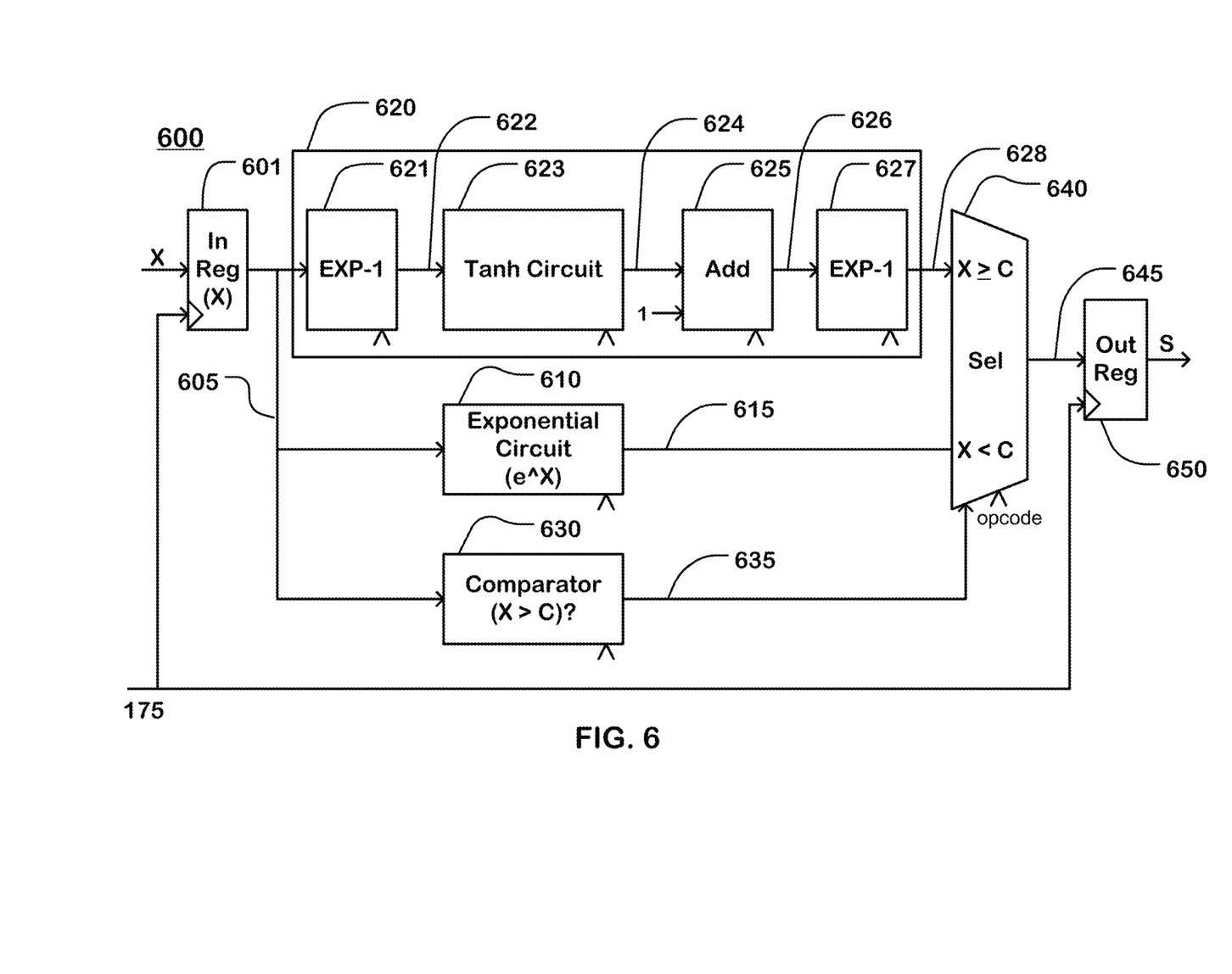
FIG. 6 illustrates an example circuit for implementing a sigmoid function using a tan h function and an exponential function in a functional unit in a configurable unit in an array of configurable units.

FIG. 6 illustrates an example circuit for implementing a sigmoid function using a tan h function and an exponential function. This circuit can be used as the sigmoid circuit 343, for example in FIG. 3, and as the module 487 in a special functional unit 483 in a configurable unit in an array of configurable units, as shown in FIG. 4.

As shown in the example of FIG. 6, a functional unit 600 includes an input register 601 to store an input variable X in a floating point format, a first circuit 610, and a second circuit 620.

The first circuit 610 has an input connected to the input register via a line 605 and an output to generate a value $e^X$ on its output. The first circuit 610 to generate a value $e^X$ on its output can be implemented using combinational logic circuits. The output of the first circuit 610 is provided to an input of a selector 640 via a line 615.

The second circuit 620 has an input connected to the input register via the line 605 and an output, to generate an output which is a value (tan h(X/2)+1)/2 on its output. The output of the second circuit 620 is provided to an input of the selector 640 via a line 628.

The functional unit 600 includes a comparator 630, having an input connected to the input register via the line 605 and an output, to generate a line 635 on its output based on a comparison between the variable X and a constant C.

A constant C can be obtained empirically running sigmoid implementations using an exponential circuit as in the first circuit 610 vs using a tan h circuit as in the second circuit 620. In one embodiment, a constant C can be a negative number of magnitude greater than 4, and can be hard coded in the circuit so that it is accessible by comparator 630. In one example, the constant C equals −4.0625.

The functional unit includes a selector 640 to select between inputs connected to the outputs of the first circuit 610 and the second circuit 620 via lines 615 and 628, respectively, in response to the output of the comparator, and provide an output representing a value sigmoid(X). Lines 615 and 628 are connected to the outputs of the first circuit 610 and the second circuit 620 respectively.

The variable X can be represented in a floating point format, and the output of the selector can be represented in the floating point format. In one embodiment, the floating point format is 16-bit Bfloat16 (BF16). The BF16 format can be represented as

| S | 8 bit exponent | 7 bit significand |
|---|---|---|

The most significant bit is the sign bit (S), with 0 for positive numbers and 1 for negative numbers. The following 8 bits represent exponent offset by +127, and the remaining 7 bit fraction with an implied or hidden eighth bit to represent the full significand. The input variable X can be represented by a significand and an exponent such as in the BF16 format. FP 32 has a similar format, with the same 8 bit exponent and the significand extended to 23 bits.

The second circuit 620 can include a stage configurable to subtract 1 from the exponent of the variable X to produce a value X/2. For instance, this stage can be implemented as a first subtraction circuit 621 that subtracts 1 from the exponent of the input variable X.

The second circuit 620 can include a stage which generates a value tan h(X/2). This stage can use the output of the first subtraction circuit 621 as its input, including the sign bit, the exponent and the significand. For instance, this stage can be implemented as a tan h circuit 623, using combinational circuit.

The second circuit 620 can include a stage which generates tan h(X/2)+1. This stage can use the output of the tan h circuit as its input via a line 624, use an adder 625 to add 1 to the output of the tan h circuit, and provide an output representing tan h(X/2)+1 on a line 626.

The second circuit 620 can include a stage to subtract 1 from the exponent of tan h(X/2)+1, to generate the value (tan h(X/2)+1)/2. This stage can use the output of the adder 625 as its input. For instance, this stage can be implemented as a second subtraction circuit 627 that subtracts 1 from the exponent. The output of the adder 625 is provided to the input of the second circuit 627 via line 626. The output of the second circuit 627 is provided to an input of the selector 640 via a line 628.

The functional unit includes an output register 650 connected to the output of the selector 640, and wherein the input register 601 and output register 650 are controlled by a unit clock on clock line 175. The unit clock can be derived from or the same as the processor clock used by the bus systems. The output representing value sigmoid(X) from the input X in the input register can be received at the output register 650 in one cycle of the unit clock. The output register 650 can provide a registered output representing a value sigmoid(X) in one cycle of the unit clock. For instance, the unit clock can operate at a unit clock rate of 1 GHz (gigahertz) in which cases one cycle of the unit clock rate is 1 ns (nanosecond).

Figure 7:
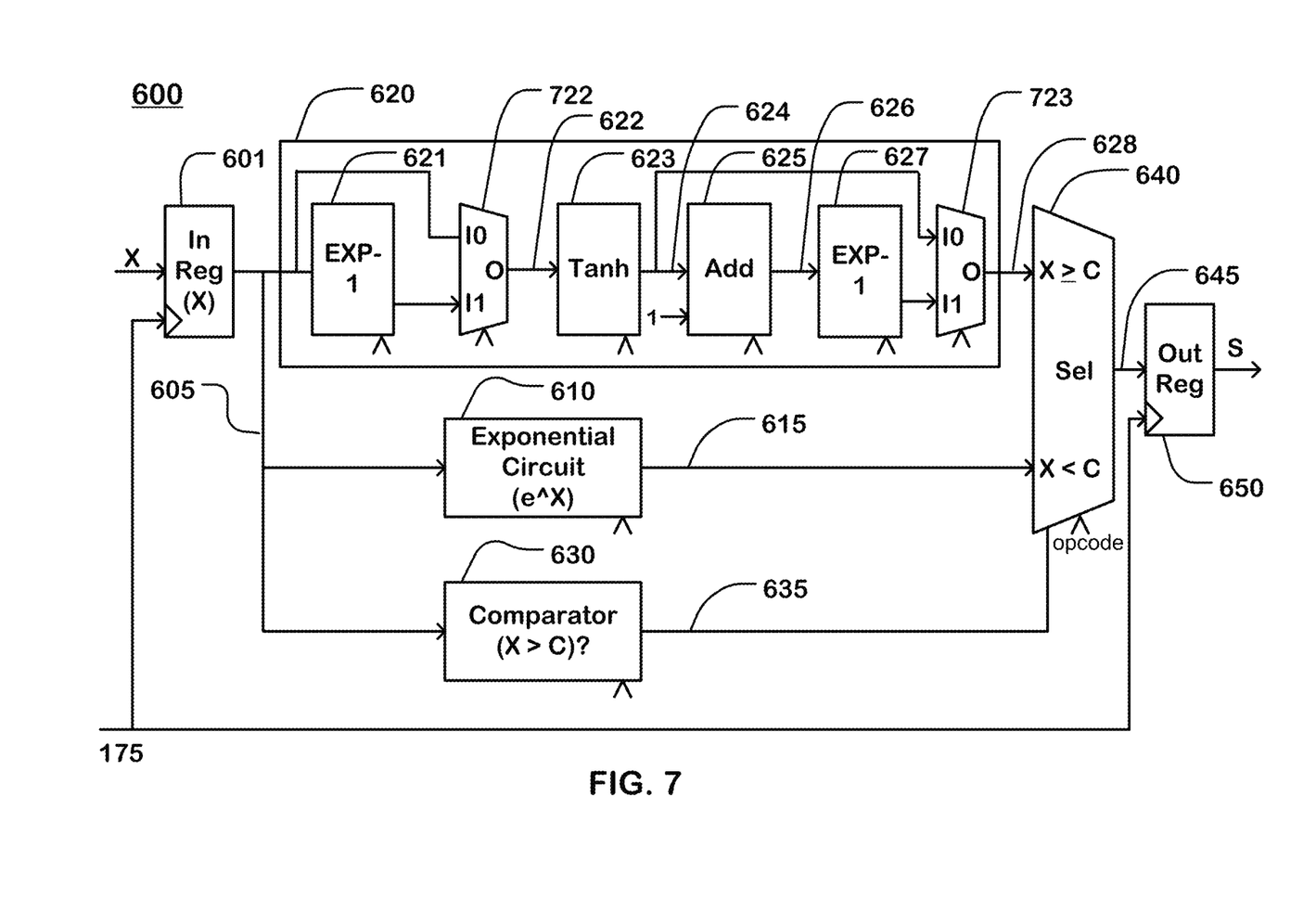
FIG. 7 illustrates an alternative embodiment where a second circuit in a functional unit in a configurable unit is configurable to provide on its output the value (tan h(X/2) +1)/2 or the value tan h(X).

FIG. 7 illustrates a functional unit configurable to provide outputs representing sig(X), tan h(X) and $e^X$, according to configuration data.

In this embodiment, the second circuit 620 in a configurable unit is configurable to provide on its output the value (tan h(X/2)+1)/2 or the value tan h(X). Like elements in FIGS. 6 and 7 are commonly referred to with like reference numerals.

In the embodiment in FIG. 7, a second selector 722 can select between inputs (I0, I1) connected to the outputs of the input register 601 and the first exponent subtraction circuit 621, and provide an output to the tan h circuit 623 via the line 622. The second selector 722 can be controlled by an opcode as indicated by a circumflex accent mark (^) to make the selection as described.

A third selector 723 can select between inputs (I0, I1) connected to the outputs of the tan h circuit 623 and the second exponent subtraction circuit 627, and provide an output to the selector 640. The third selector 723 can be controlled by an opcode as indicated by a circumflex accent mark (^) to make the selection as described.

When the second selector 722 selects an input (e.g. I0) connected to the output of the input register 601, and the third selector 723 selects an input (e.g. I0) connected to the output of the tan h circuit 623, a second circuit (e.g. 620) in a configurable unit is configurable to provide on its output the value tan h(X).

When the second selector 722 selects an input (e.g. I1) connected to the output of the first exponent subtraction circuit 621, and the third selector 723 selects an input (e.g. I1) connected to the output of the second exponent subtraction circuit 627, a second circuit (e.g. 620) in a configurable unit is configurable to provide on its output the value (tan h(X/2)+1)/2.

The selector 640 can be controlled by configuration bits including an opcode as indicated by a circumflex accent mark (A) to provide an output to the output register 645 either in response to the output on line 635 of the comparator 630 or independent of the output on line 635 of the comparator 630.

Depending on the opcode, the selector 640 can select the input connected to the output of the first circuit 610 independent of the output of the comparator 630 to provide the value $e^X$ on its output, and to select the input connected to the output of the second circuit 620 independent of the output of the comparator to provide the value tan h(X).

For instance, a 2-bit opcode for the selector 640 can have a value "01" to indicate providing an output representing the sig(X) and a value "02" to indicate selecting providing an output representing tan h(X) and a value "03" to indicate providing the value $e^X$ on its output.

Figure 8:
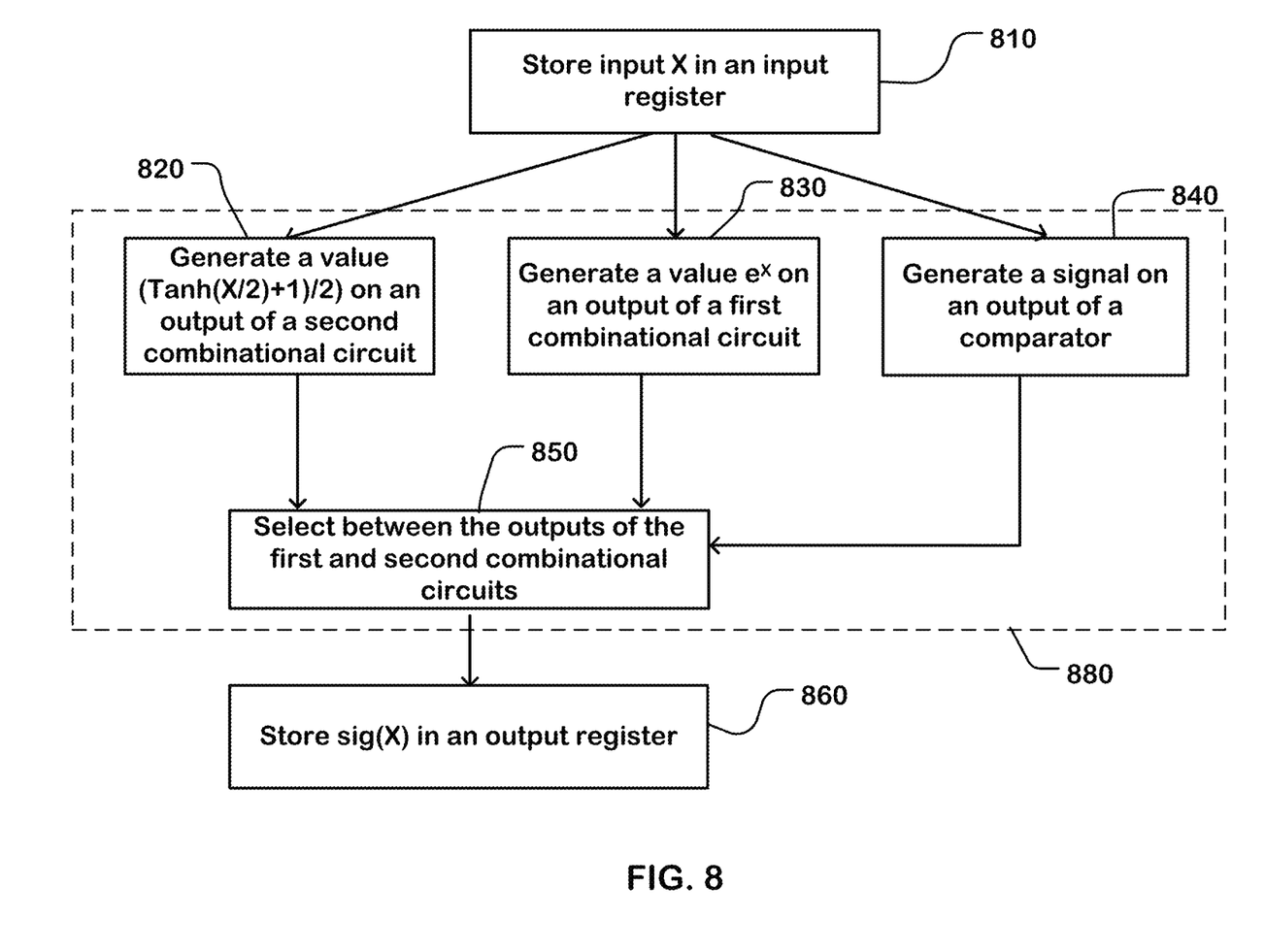
FIG. 8 is a flowchart illustrating a method for computing a sigmoid function in a functional unit for a data processor.

FIG. 8 is a flowchart illustrating a method for computing a sigmoid function in a functional unit. The flowchart begins at 810, by storing an input variable X in an input register (e.g. 601, FIG. 6). The input variable can be represented in a floating point format, such as BF16 and FP32.

The input register output is coupled to combinational logic 880, which executes the functions using combinational stages 820, 830, 840 in parallel circuits. In function 820, a value (tan h(X/2)+1)/2) is generated (e.g. 620, FIG. 6). In function 830, a value $e^X$ is generated (e.g. 610, FIG. 6). In function 840, a signal is generated on an output of a comparator (e.g. 630, FIG. 6) based on a comparison between X and a constant C.

In function 850, a selection is made between (tan h(X/2)+1)/2) and $e^X$, as a function of the signal output by function 840. Then, the selected value representing sig(X) is stored in an output register in function 860.

The combinational logic 880 can operate at high speed, with the output being received and available to be stored at the output register in one clock cycle of a unit clock, after being enabled to execute on the input variable stored in the input register.

Implementations of circuitry to provide the sigmoid function as described herein can be very area and power efficient, meeting specifications for unit GHz clock speeds or more, and supply voltages less than 1 V.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A functional unit, comprising:
    an input register to store a variable X;
    a first circuit, having an input connected to the input register and an output, to generate a value $e^X$ on its output;
    a second circuit, having an input connected to the input register and an output, to generate an output which is a value (tan h(X/2)+1)/2 on its output;
    a comparator, having an input connected to the input register and an output, to generate a signal on its output based on a comparison between X and a constant; and
    a selector to select between the outputs of the first circuit and the second circuit, in response to the output of the comparator, and provide an output representing a value sigmoid(X).

2. The functional unit of claim 1, wherein the constant is a negative number of magnitude greater than 4.

3. The functional unit of claim 1, wherein the variable X is represented in a floating point format, and the output of the selector is represented in the floating point format.

4. The functional unit of claim 1, wherein the variable X is represented by a sign bit, a significand, and an exponent, and the second circuit includes combinational logic comprising a stage configurable to subtract 1 from the exponent of the variable X to produce a value X/2, a stage which generates a value tan h(X/2), a stage which generates tan h(X/2)+1, and a stage to subtract 1 from the exponent of tan h(X/2)+1, to generate the value (tan h(X/2)+1)/2.

5. The functional unit of claim 1, including an output register connected to the output of the selector, and wherein the first and second circuits are combinational circuits, and wherein the input register and output register are controlled by a unit clock.

6. The functional unit of claim 1, including an output register connected to the output of the selector, and wherein the input register and output register are controlled by a unit clock, and the output representing the value sigmoid(X) from the input X in the input register is stored in the output register in one cycle of the unit clock.

7. The functional unit of claim 1, wherein the second circuit is configurable to provide on its output the value (tan h(X/2)+1)/2 or the value tan h(X).

8. The functional unit of claim 7, wherein the selector is configurable to select between the outputs of the first circuit and the second circuit, in response to the output of the comparator, and provide an output representing a value sigmoid(X), to select the output of the first circuit independent of the output of the comparator to provide the value $e^X$ on its output, and to select the output of the second circuit independent of the output of the comparator to provide the value tan h(X).

9. A reconfigurable data processor, comprising:
an array of configurable units; and
a bus system connected to the array of configurable units which communicates data at a processor clock rate, wherein a configurable unit (PCU) in the array of configurable units (CGRA) includes a functional unit, the functional unit including:
an input register to store a variable X;
a first circuit, having an input connected to the input register and an output, to generate a value $e^X$ on its output;
a second circuit, having an input connected to the input register and an output, to generate an output which is a value (tan h(X/2)+1)/2 on its output;
a comparator, having an input connected to the input register and an output, to generate a signal on its output based on a comparison between X and a constant; and
a selector to select between the outputs of the first circuit and the second circuit, in response to the output of the comparator, and provide an output representing a value sigmoid(X).

10. The data processor of claim 9, wherein the constant is a negative number of magnitude greater than 4.

11. The data processor of claim 9, wherein the variable X is represented in a floating point format, and the output of the selector is represented in the floating point format.

12. The data processor of claim 9, wherein the variable X is represented by a sign bit, a significand, and an exponent, and the second circuit includes combinational logic comprising a stage configurable to subtract 1 from the exponent of the variable X to produce a value X/2, a stage which generates a value tan h(X/2), a combinational logic stage which generates tan h(X/2)+1, and a stage to subtract 1 from the exponent of tan h(X/2)+1, to generate the value (tan h(X/2)+1)/2.

13. The data processor of claim 9, including an output register connected to the output of the selector, and wherein the input register and output register are controlled by a unit clock.

14. The data processor of claim 9, including an output register connected to the output of the selector, and wherein the input register and output register are controlled by a unit clock, and the output representing value sigmoid(X) from the input X in the input register is stored in the output register in one cycle of the unit clock.

15. The data processor of claim 9, wherein the second circuit is configurable to provide on its output the value (tan h(X/2)+1)/2 or the value tan h(X).

16. The data processor of claim 15, wherein the selector is configurable to select between inputs connected to the outputs of the first circuit and the second circuit, in response to the output of the comparator, and provide an output representing a value sigmoid(X), to select the input connected to the output of the first circuit independent of the output of the comparator to provide the value $e^X$ on its output, and to select the input connected to the output of the second circuit independent of the output of the comparator to provide the value tan h(X).

17. A method for computing a sigmoid function in a functional unit for a data processor, comprising:
storing a variable X in an input register;
generating a value $e^X$ on an output of a first circuit;
generating a value (tan h(X/2)+1)/2 on an output of a second circuit;
generating a signal on an output of a comparator based on a comparison between X and a constant;
selecting between the outputs of the first circuit and the second circuit, in response to the output of the comparator, and providing a result representing a value sigmoid(X).

18. The method of claim 17, wherein the constant is a negative number of magnitude greater than 4.

19. The method of claim 17, wherein the variable X is represented in a floating point format, and the result is represented in the floating point format.

20. The method of claim 17, wherein the variable X is represented by a sign bit, a significand, and an exponent, and the second circuit includes combinational logic to subtract 1 from the exponent of the variable X to produce a value X/2, to generate a value tan h(X/2), to add 1 to generate tan h(X/2)+1, and to subtract 1 from the exponent of tan h(X/2)+1, to generate the value (tan h(X/2)+1)/2.

21. The method of claim 17, including registering the output of the selector using an output register connected to the output of the selector, and wherein the input register and output register are controlled by a unit clock.

22. The method of claim 17, including registering the result using an output register connected to the output of the selector, and wherein the input register and output register are controlled by a unit clock, and the output representing value sigmoid(X) from the input X in the input register is stored in the output register in one cycle of the unit clock.

* * * * *